United States Patent
Choi

(10) Patent No.: US 7,787,890 B2
(45) Date of Patent: Aug. 31, 2010

(54) MOBILE COMMUNICATION TERMINAL FOR PROVIDING GEOGRAPHICAL INFORMATION AND METHOD THEREOF

(75) Inventor: Hyun-Kyung Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 542 days.

(21) Appl. No.: 11/408,077

(22) Filed: Apr. 21, 2006

(65) Prior Publication Data

US 2006/0240847 A1 Oct. 26, 2006

(30) Foreign Application Priority Data

Apr. 23, 2005 (KR) .................. 10-2005-0033844

(51) Int. Cl.
*H04W 24/00* (2009.01)
(52) U.S. Cl. .................................. 455/456.2
(58) Field of Classification Search .............. 455/461, 455/456.6, 456.1, 466, 457, 410, 456.2, 12.1
See application file for complete search history.

(56) References Cited

U.S. PATENT DOCUMENTS

| | | | |
|---|---|---|---|
| 6,115,611 A | 9/2000 | Kimoto et al. | |
| 6,836,727 B2 | 12/2004 | Kunigita | |
| 7,224,991 B1 * | 5/2007 | Fuoss et al. | ............ 455/466 |
| 2002/0034964 A1 * | 3/2002 | Bannai et al. | ............ 455/556 |
| 2003/0073446 A1 | 4/2003 | Tsuchiya | |
| 2005/0278737 A1 | 12/2005 | Ma et al. | |
| 2006/0030339 A1 * | 2/2006 | Zhovnirovsky et al. | .. 455/456.6 |
| 2006/0248570 A1 | 11/2006 | Witwer | |

FOREIGN PATENT DOCUMENTS

| | | |
|---|---|---|
| CN | 1413026 A | 4/2003 |
| CN | 1476570 A | 2/2004 |
| EP | 1 168 715 A2 | 1/2002 |
| EP | 1 288 626 A2 | 3/2003 |
| JP | 10-013961 A | 1/1998 |
| JP | 10-143520 A | 5/1998 |
| JP | 11-004483 A | 1/1999 |
| JP | 2002-229990 A | 8/2002 |
| JP | 2003-196286 A | 7/2003 |
| JP | 2004-48180 A | 2/2004 |
| JP | 2004-070624 A | 3/2004 |
| JP | 2004-228996 A | 8/2004 |
| KR | 10-2004-0104210 A | 12/2004 |
| WO | WO-97/13368 A1 | 4/1997 |
| WO | WO-2005/045603 A2 | 5/2005 |

* cited by examiner

*Primary Examiner*—Melody Mehrpour
(74) *Attorney, Agent, or Firm*—Birch, Stewart, Kolasch & Birch, LLP

(57) ABSTRACT

A mobile communication terminal including gps reception unit configured to receive location information indicating where the mobile terminal is located, a display unit configured to display geographical information based on the received location information, and a controller configured to provide additional information corresponding to the displayed geographical information. Further, the additional information includes a photo or video corresponding to the geographical information.

10 Claims, 4 Drawing Sheets

US 7,787,890 B2

MOBILE COMMUNICATION TERMINAL FOR PROVIDING GEOGRAPHICAL INFORMATION AND METHOD THEREOF

This application claims priority to Korean Application No. 10-2005-0033844 filed in Korea on Apr. 23, 2005, the entire contents of which is hereby incorporated by reference in its entirety.

BACKGROUND OF THE INVENTION

1. Field of the Invention

The present invention relates to a mobile communication terminal and method that allows a user to view a photo or movie, for example, corresponding to retrieving geographical information.

2. Description of the Related Art

A mobile communication terminal allows a user to wirelessly communicate with another party via a switching operation in a mobile switching center (MSC) while traveling in a service area managed by a base station (BS). The mobile terminal also provides multimedia communications including image signals and data information such as symbols, numbers and characters. The mobile terminal also has a large-scale display unit and a camera for taking videos and pictures. In addition, one of the supplemental services allow a user to receive geographical information using a Location Based Service (LBS). The LBS may also be integrated with a Geographical Information System (GIS), a Global Positioning System (GPS), an Intelligent Transport System (GTS) and other techniques.

Many other various supplementary services are also provided by the mobile terminal and the demand is high for these supplementary services.

However, the related art mobile communication terminal providing geographical information has the following problem. That is, because the mobile communication terminal provides only previously fabricated geographical map information, the user cannot receive any additional information besides the previously fabricated map information.

SUMMARY OF THE INVENTION

Accordingly, an object of the present invention is to address the above-noted and other problems.

Another object of the present invention is to provide a mobile communication terminal and method that provides additional information which can be connected with displayed geographical information by an anchor tag based on location information of a user.

To achieve these and other advantages and in accordance with one aspect of the present invention, as embodied and broadly described herein, the present invention provides a mobile communication terminal including a Global Positioning System (GPS) reception unit configured to receive location information indicating where the mobile terminal is located, a display unit configured to display geographical information based on the received location information, and a controller configured to provide additional information corresponding to the displayed geographical information.

According to another aspect, the present invention provides a method for providing geographical information to a mobile communication terminal. The method includes receiving geographical information based on location information indicating where the mobile terminal is located, displaying the received geographical information, and downloading additional information corresponding to the displayed geographical information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
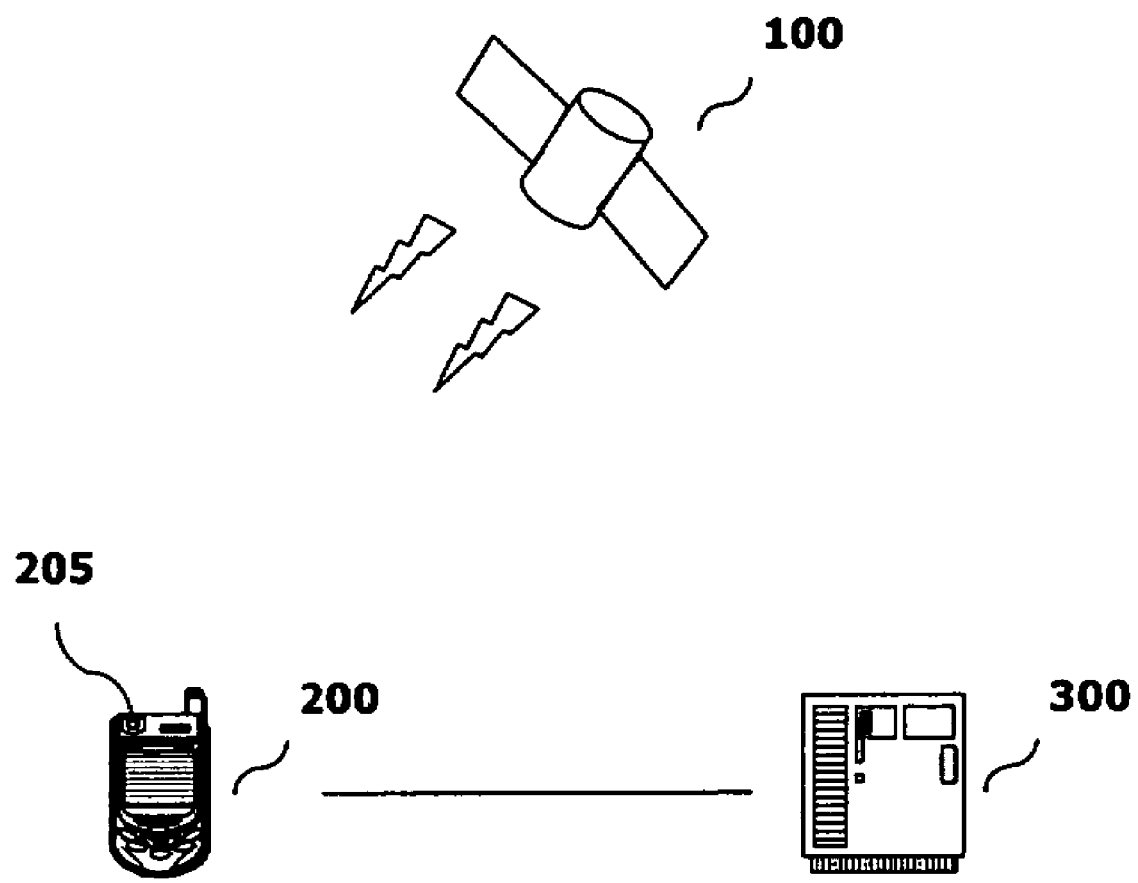
FIG. 1 is an overview illustrating a mobile communication system providing geographical information in accordance with an embodiment of the present invention.

Turning first to FIG. 1, which illustrates an overview of a mobile communication system providing geographical information in accordance with an embodiment of the present invention. As shown, the mobile communication system includes at least one satellite 100, a mobile terminal 200 and a server 300. The mobile terminal 200 is used by a user who requests geographical information about where he or she is located, and the satellite 100 and server 300 provide the requested geographical information to the user. The mobile terminal 200 also includes a camera 205 allowing the user to take pictures or movies.

Further, the server 300 in accordance with an embodiment of the present invention also provides additional information such as a photo file or image file corresponding to the geographical information in addition to the provided geographical information. The additional information can also be connected with the geographical information by an anchor tag. That is, the anchor tag links the additional information with the geographical information such that all information may be provided to the user.

Figure 2:
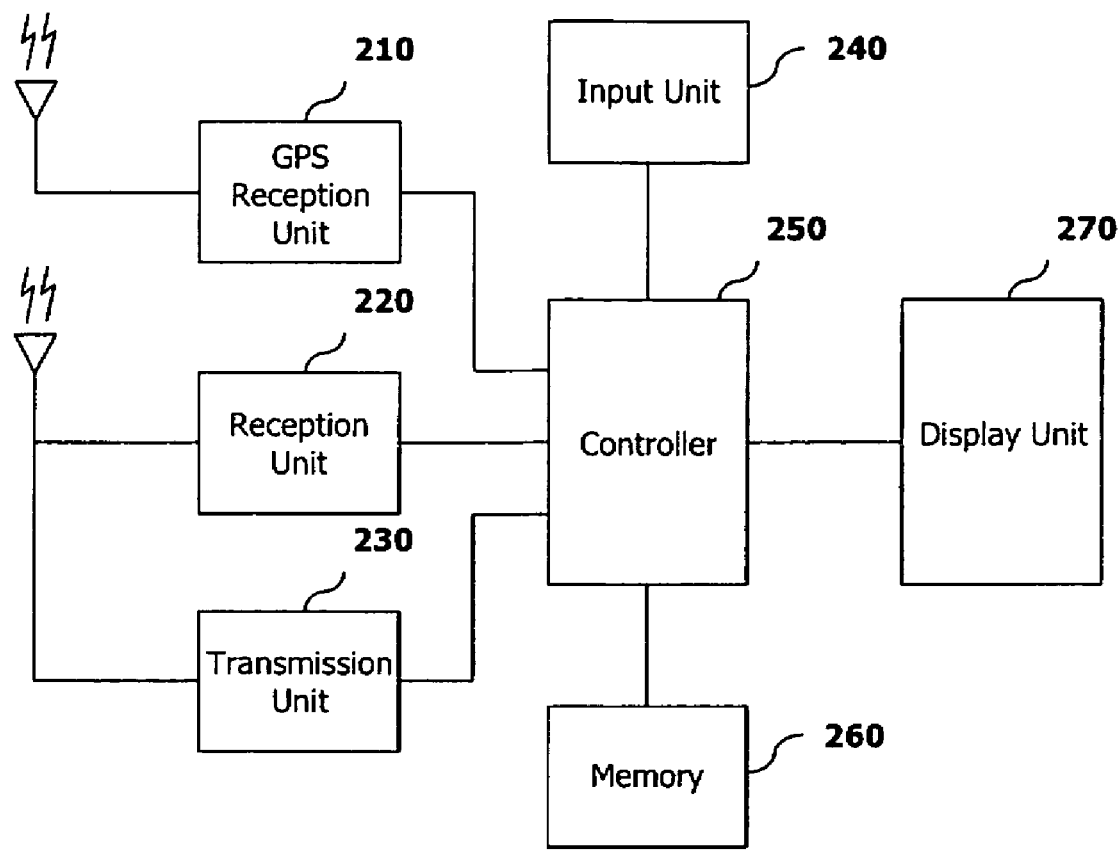
FIG. 2 is a block diagram of a mobile communication terminal providing geographical information in accordance with an embodiment of the present invention.

Turning next to FIG. 2, which is a block diagram of a mobile communication terminal providing geographical information in accordance with an embodiment of the present invention. The mobile terminal may be a mobile phone, Personal Digital Assistant (PDA), notebook computer or other wireless device.

As shown in FIG. 2, the mobile terminal includes a GPS reception unit 210 for receiving location information about where the user using the mobile terminal is located, a reception unit 220 for receiving geographical information based on the received location information, a display unit 270 such as a Liquid Crystal Display (LCD) for displaying the received geographical information, a controller 250 for controlling the different components of the terminal, a memory 260 for storing the geographical information and additional information, and a transmission unit 230 for transmitting stored additional information.

Thus, the mobile communication terminal in accordance with an embodiment of the present information can download additional information corresponding to the geographical information from the server 300 or upload the additional information to the server 300. The geographical information corresponds to a map, for example, and the additional information corresponds to a photo or movie of the geographical information. These features will now be described with reference to FIGS. 3 and 4.

Figure 3:
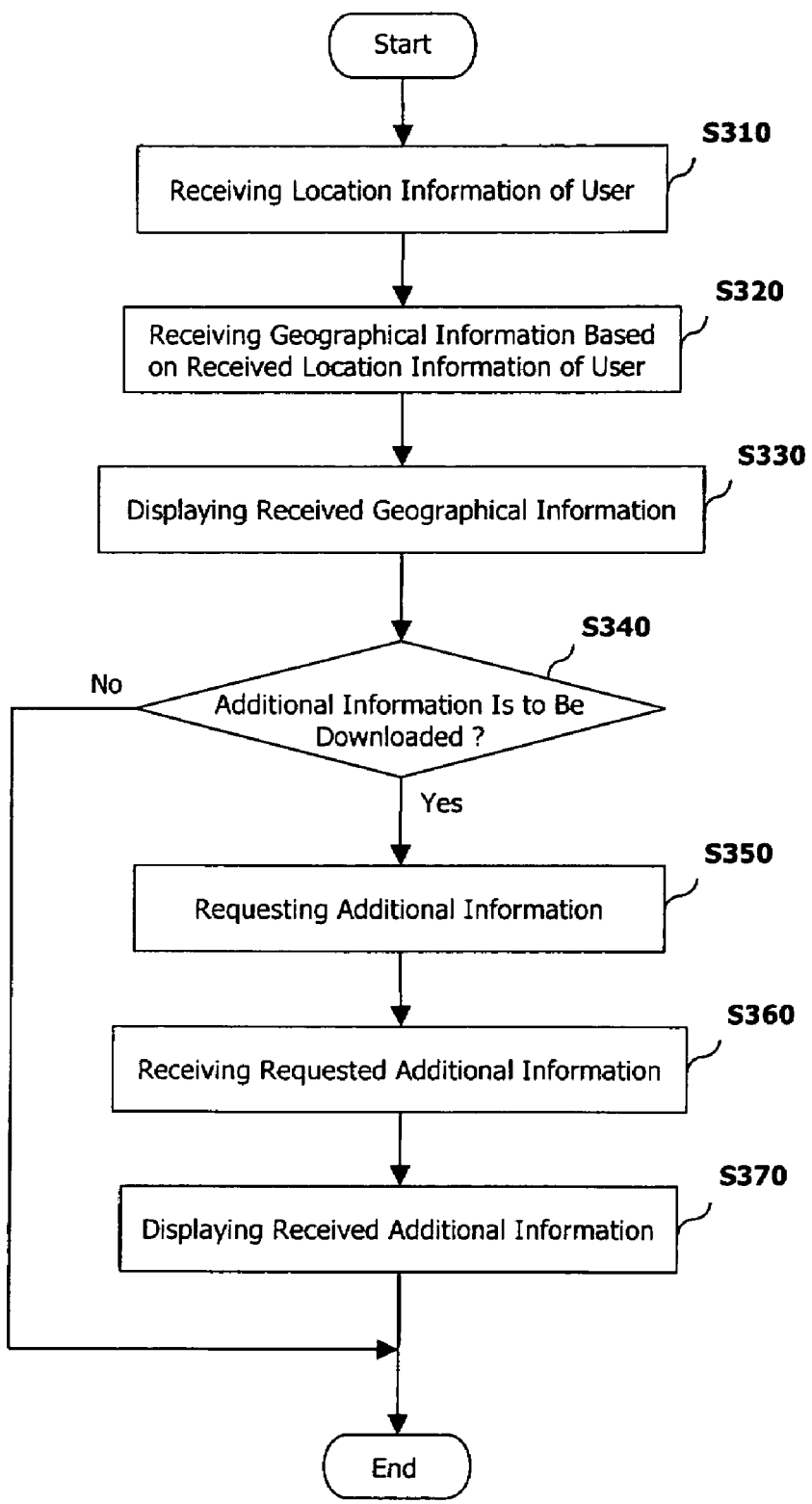
FIG. 3 is a flowchart illustrating a method for downloading geographical information to the mobile communication terminal in accordance with an embodiment of the present invention.

In more detail, FIG. 3 is a flowchart illustrating a method for downloading and displaying additional information in addition to geographical information on the mobile communication terminal in accordance with an embodiment of the present invention. FIG. 2 will also be used in this description.

As shown in FIG. 3, the mobile terminal 200 receives location information of the user (step S310). Namely, the GPS reception unit 210 (see FIG. 2) receives the location information of the user through the satellite 100 and outputs the received location to the controller 250. The location information can be latitude and longitude coordinates, for example.

Then, the mobile terminal 200 receives geographical information such as a map including the latitude and longitude based on the received location information of the user (step S320). Namely, the controller 250 provides the received location information to the server 300 through the transmission unit 230, and the server 300 searches for geographical information corresponding to the provided location information and transmits the appropriate geographical information to the mobile terminal 200. In this example, the server 300 refers to an LBS server.

The mobile communication terminal 200 then displays the received geographical information (step S330). That is, after the controller 250 stores the received geographical information in the memory 260, the controller 250 displays the stored geographical information on the display unit 270. Further, in accordance with an embodiment of the present invention, the display unit 270 includes a button or menu option, for example, allowing the user to request additional information in addition to the displayed geographical map information. For example, and as discussed above, the additional information may be a photo file or a video file which visually indicates the displayed geographical information. Also, the requested geographical information and the additional information are linked together via an anchor tag.

Thus, the controller 250 appropriately determines whether or not the user has requested the additional information be downloaded (step S340). Namely, if the user wants to download the additional information, the mobile terminal 200 transmits an additional information request message to the server 300 (step S350). Then, the server 300 searches for the additional information based on the received message and transmits the additional information to the mobile terminal 200.

Figure 4:
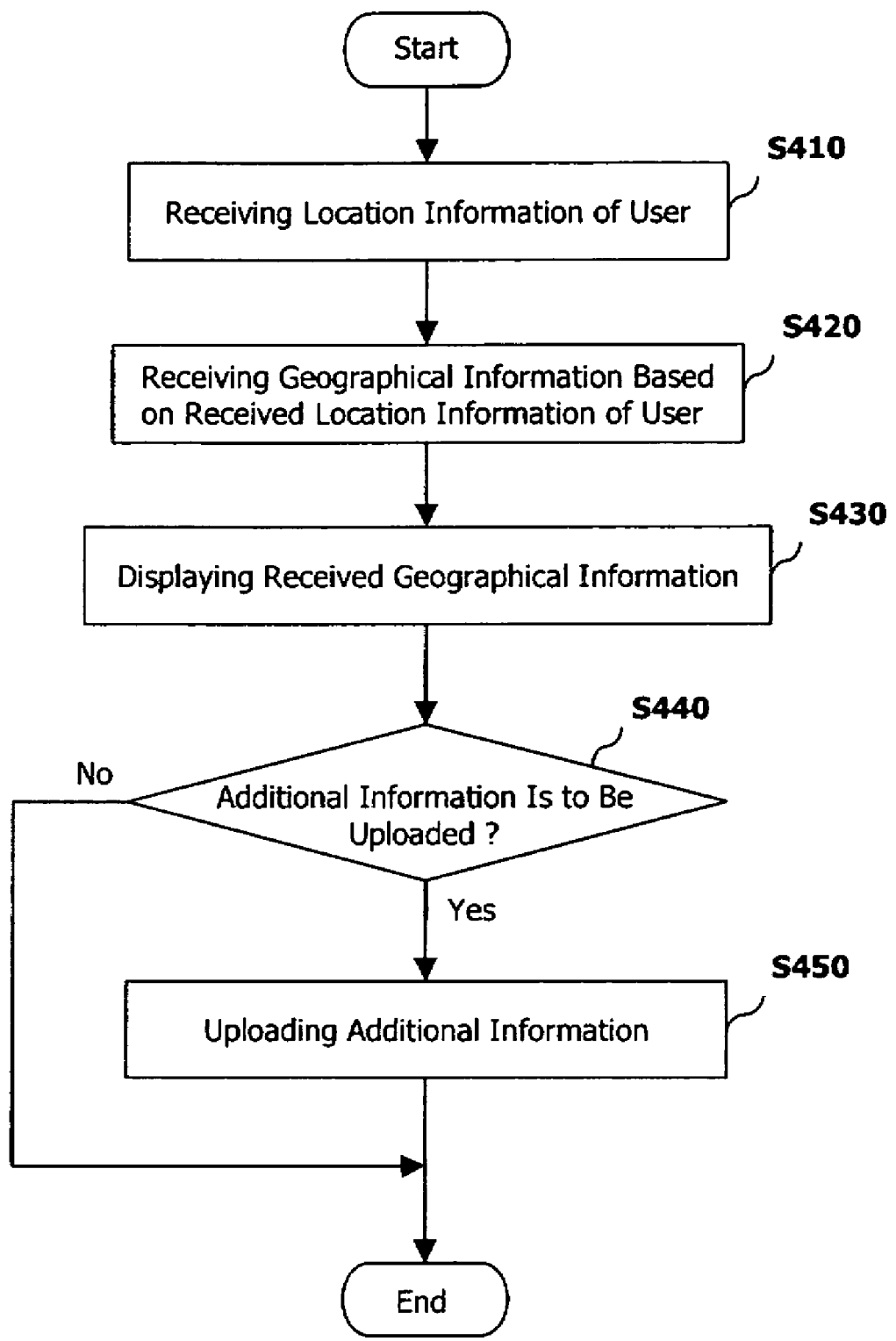
FIG. 4 is a flowchart illustrating a method for uploading geographical information from the mobile communication terminal in accordance with an embodiment of the present invention.

Accordingly, the mobile terminal 200 receives the additional information (step S360) and displays the additional information on the display unit 270 (step S370). That is, the controller 250 stores the received additional information in the memory 260 and then displays the stored additional information on the display unit 270. Thus, a user may view a picture or video of an area where he or she is located. Turning next to FIG. 4, which is a flowchart illustrating a method for uploading geographical information from the mobile terminal 200 to the server 300 in accordance with an embodiment of the present invention. FIG. 2 will also be referred to in this description.

As shown in FIG. 4, the mobile terminal 200 receives location information of the user (step S410). Namely, the GPS reception unit 210 receives the location information of the user through the satellite 100 and outputs the received information to the controller 250. Then, the mobile communication terminal receives geographical information based on the received location information of the user (step S420). That is, the controller 250 provides the received location information to the server 300 through the transmission unit 230, and the server 300 searches for geographical information corresponding to the provided location information and transmits the geographical information to the mobile communication terminal 200. The mobile terminal 200 then displays the received geographical information (step S430). Namely, after the controller 250 stores the received geographical information in the memory 260, the controller 250 displays the stored geographical information on the display unit 270. This is similar to the method discussed in FIG. 3.

The controller 250 then determines whether or not the user wants to upload additional information corresponding to the displayed geographical information from the terminal 200 to the server 300 (step S440). If the controller 250 determines the user wants to upload additional information, the controller 250 transmits the additional information stored in the memory 260 to the server 300 (step S450). Then, the server 300 stores the received additional information and sets an anchor flag linking the stored additional information with the geographical information. Thus, in this embodiment, the user can take a picture or video of a location he or she is currently at, and have this additional information uploaded to the server 300.

As so far described, the mobile terminal and method for providing geographical information in accordance with embodiments of the present invention are advantageous because the user can upload or download additional information in addition to referenced geographical information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
 a global positioning system (gps) reception unit configured to receive location information indicating where the mobile terminal is located;
 a controller configured to provide the received location information to a remote server;
 a reception unit configured to receive geographical information from the remote server that corresponds with the location information provided to the remote server, said received geographical information comprising a previously fabricated map of where the mobile terminal is located;
 a display unit configured to display the received geographical information; and a camera function configured to capture user-created information comprising a current photo file or image file, wherein the controller is further configured to link together the user-created information and the received geographical information via an anchor tag, and to upload the captured user-created information to the remote server based on the user's selection, said captured user-created information being stored on the remote server and linked to the geographical information on the server via the anchor tag, wherein the controller is further configured to cause the display unit to display information indicating that there is additional information linked to the received geographical information, the additional information linked to the received geographical information by the anchor tag, and to download an item of the additional information from the remote server in response to a corresponding additional data download command.

2. The terminal of claim 1, wherein the reception unit is further configured to subsequently receive, from the remote server, the geographical information along with information indicating that the user-created information is linked to the geographical information, and download the user-created information from the remote server based on the user's selection.

3. The terminal of claim 2, wherein the display unit is further configured to display the user-created information.

4. The terminal of claim 1, further comprising:
a memory configured to store the geographical information and the user-created information corresponding to the geographical information.

5. The terminal of claim 1, wherein the terminal comprises a mobile phone, a Personal Digital Assistant (PDA) or a notebook computer.

6. A method of controlling a mobile communication terminal, the method comprising:
receiving location information indicating where the mobile terminal is located from a global positioning system (gps);
providing the received location information to a remote server;
receiving geographical information from the remote server that corresponds with the location information, said geographical information comprising a previously fabricated map of where the mobile terminal is located;
displaying the received geographical information;
capturing user-created information using a camera included on the mobile terminal, said user-created information comprising a current photo file or image file visually depicting the geographical information;
linking together the user-created information and the geographical information via an anchor tag; and
uploading the captured user-created information to the remote server based on the user's selection, said captured user-created information being stored on the remote server and linked to the geographical information on the server via the anchor tag,
wherein the displaying the received geographical information includes displaying information indicating that there is additional information linked to the received geographical information, the additional information linked to the received geographical information by the anchor tag, the method further comprising:
downloading one item of the additional information from the remote server in response to a corresponding additional data download command.

7. The method of claim 6, further comprising:
subsequently receiving, from the remote server, the geographical information along with information indicating that the user-created information is linked to the geographical information; and
downloading the user-created information from the remote server based on the user's selection.

8. The method of claim 7, further comprising:
displaying the downloaded user-created information.

9. The method of claim 6, further comprising:
storing the geographical information and the user-created information corresponding to the geographical information.

10. The method of claim 6, wherein the terminal comprises a mobile phone, a Personal Digital Assistant (PDA) or a notebook computer.

* * * * *